(12) United States Patent
Fling et al.

(10) Patent No.: US 6,955,083 B2
(45) Date of Patent: Oct. 18, 2005

(54) VERTICAL LIQUID LEVEL MEASURING DEVICE

(76) Inventors: William F. Fling, P.O. Box 265, Little River, CA (US) 95456; John J. Fling, P.O. Box 265, Little River, CA (US) 95456

( * ) Notice: Subject to any disclaimer, the term of this patent is extended or adjusted under 35 U.S.C. 154(b) by 0 days.

(21) Appl. No.: 10/737,615

(22) Filed: Dec. 15, 2003

(65) Prior Publication Data

US 2005/0126283 A1 Jun. 16, 2005

(51) Int. Cl.$^7$ ................................................ G01F 23/30
(52) U.S. Cl. .......................... 73/318; 73/305; 73/321; 73/322
(58) Field of Search .................... 73/305, 313, 312, 73/317, 318, 319, 320, 321, 322

(56) References Cited

U.S. PATENT DOCUMENTS

| | | | | | |
|---|---|---|---|---|---|
| 1,307,546 | A | * | 6/1919 | Gregory | 73/306 |
| 1,456,743 | A | * | 5/1923 | Szabo | 73/316 |
| 1,641,380 | A | * | 9/1927 | Geyer | 73/305 |
| 2,219,366 | A | * | 10/1940 | Johansson | 73/317 |
| 2,241,983 | A | * | 5/1941 | Connolly | 310/104 |
| 2,300,614 | A | * | 11/1942 | Connolly et al. | 73/317 |
| 2,578,104 | A | * | 12/1951 | Taylor | 73/317 |
| 3,709,038 | A | * | 1/1973 | Werner | 73/313 |
| 3,793,884 | A | | 2/1974 | Fling et al. | |
| 4,092,861 | A | | 6/1978 | Fling | |
| 4,147,060 | A | | 4/1979 | Fling et al. | |
| 4,154,103 | A | | 5/1979 | Fling | |
| 4,987,400 | A | * | 1/1991 | Fekete | 338/164 |
| 4,991,436 | A | * | 2/1991 | Roling | 73/320 |
| 5,148,709 | A | * | 9/1992 | Ross, Jr. | 73/320 |
| 5,410,913 | A | * | 5/1995 | Blackburn | 73/313 |

* cited by examiner

*Primary Examiner*—Michael Cygan
(74) *Attorney, Agent, or Firm*—Lynn & Lynn

(57) ABSTRACT

A system for actuating an indicator in response to a depth change in a liquid that is confined to a container comprises a housing, a float constrained to vertical movement in response to changes in liquid depth in the container, an actuator connected to the housing and arranged to move in response to vertical movement of the float, and a coupler mechanism mounted between the actuator and the housing and arranged to transfer movement of the actuator to the indicator.

12 Claims, 4 Drawing Sheets

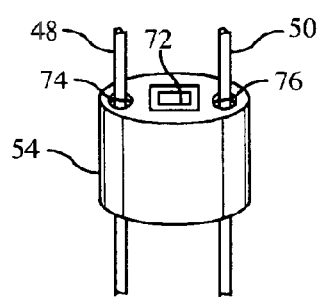
FIG. 9
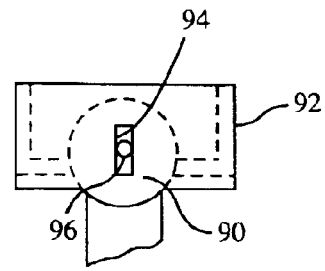
FIG. 10
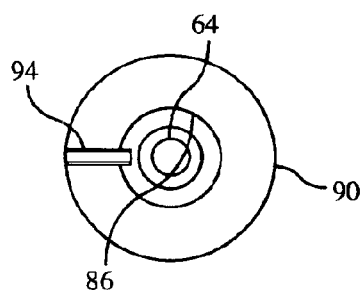
FIG. 11
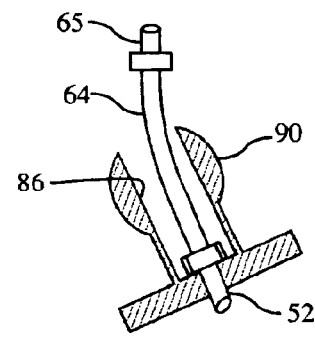
FIG. 12
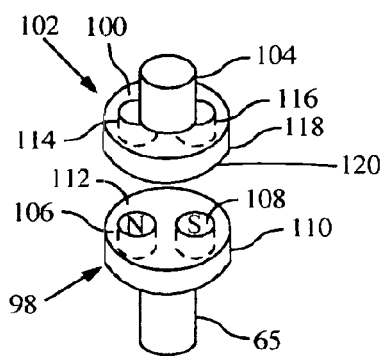
FIG. 13
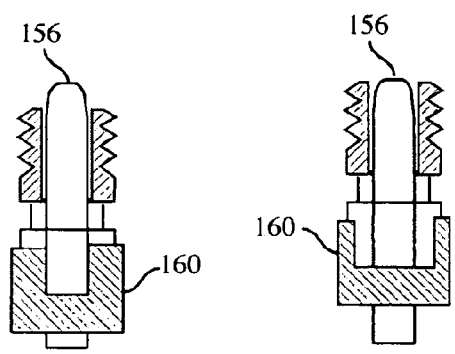
FIG. 14   FIG. 15

VERTICAL LIQUID LEVEL MEASURING DEVICE

BACKGROUND OF THE INVENTION

The present invention relates generally to the measurement of the quantity of liquid in a container, vessel, barrel, drum, or the like. More particularly this invention relates to an improved liquid level measurement device having a float drive mechanism that includes a magnetic coupler arranged to activate an indicator pointer to indicate the liquid level in a container or the like.

DESCRIPTION OF PRIOR ART

There are many instances in which it is essential or desirable to be able to measure the level of liquid in a container, barrel, or the like, and in that manner determine the volume or quantity of liquid in the container. For example, numerous companies, business, shops, institutions and other organizations either transporting, storing or dispersing of liquid products, find it convenient to introduce chemicals, lubricants and fuels directly from shipping containers, i.e., drums, barrels, into their processes. This saves time and expense of having additional large bulk storage tanks and equipment to transfer the contents of the bulk storage tanks to the smaller containers. Drums are used throughout the world to transport, store, distribute, and dispense a variety of liquid products. For example, manufacturing firms use individual drums or an entire rack or rows of racks in their manufacturing processes. Material handling dealers and suppliers of chemical products package and distribute their liquid products in drums. In addition, farms, construction sites, schools, machine shops, printing firms, military, government, and numerous other organizations find the use of containers a useful way of handing their liquid products requirements.

A frequently used device for measuring the liquid contents of drums and or containers is a liquid level detector. There are a number of devices in the market place that serve this purpose. One of these devices is the standard sight gauge consisting of a metal pipe with a glass window to view of the level of liquid. The viewing glass has a gauge registered to the nearest gallon. In addition, the device is equipped with a threaded fitting on one end to fit a standard ¾-inch threaded bunghole and to accommodate a faucet on the other end. The sight gauge devices suffer from a number of deficiencies that make them unsatisfactory for extended-life measuring purposes. For example, the device is not equipped with a pressure relief valve for drum venting purposes and must rely on a separate device to provide this capability. The glass view port is subject to fogging due to condensation and discolorization and lacks the convenience of a large dial for easy, at a glance reading in increments of gallons or liters. Also the external mounting design lends itself to damage through mishandling and breakage.

Another device in use in the measurement of drums, small tanks and containers is a self-contained unit with a magnet-equipped float that moves with the liquid level along the unit stem, inside the storage container. A liquid level readout is obtained by simply removing the protective cap at the top of the unit and lifting the calibrated indicator (within the unit) until magnetic interlock with the float is felt. The indicator is then lowered back inside the unit for storage and is protected by the screw cap when not in use. This unit suffers from a number of deficiencies, namely it is cumbersome to use, provides readouts in inches only, does not provide at-a-glance check of drum contents, and is not applicable to stack drum racks, and is restrictive in use in confined storage spaces were the drum must be moved to an open floor space to be used. This unit is not equipped with a built in pressure relief valve capability.

The wood dipstick is another method for measurement of container liquid levels but at best gives an approximate measurement of liquid levels. This approach is dependent upon the residual liquid wet-line to indicate the liquid level in the container. The wet line is subjected to "splashing" and evaporation when exposed to air or to the elements, which distorts the accuracy of the measurement, and leads to approximate readings at best The gauge on the typical wood stick is not refined and therefore lacks accuracy and provides approximate measurements at best. The stamped painted gauge on the stick is subject to ware and fads in time. In addition, the wood construction of the stick leads to splintering and breakage over time.

Another device used to measure liquid levels within containers is a drum gauge that is confined to upright mounted drums. The device consists of an indicator with a plastic housing with an attached flexible rod, the top of which is affixed with a washer used as a pointer. The indicator is screwed into the drum bunghole for mounting to the drum. The indicator is inscribed with a scale calibrated in gallons, liters and inches. As float moves up or down with changing liquid levels the indicator rod with the attached washer pointer registers against the scale. As in the instance of the sight gauge device, the plastic indicator housing containing the imprinted scale is subject to the corrosive effects of fumes venting from the container into the indicator housing. In addition, the plastic housing is subject to fogging. These two conditions contribute to reduce visibility in viewing the readout of liquid levels and shorten the useful life of the device. In addition; the device tends not to deploy in a full drum condition because when the float and associated rod contact the liquid the unit extends in a horizontal direction and thus contacts the side of the drum making installation difficult and time consuming.

SUMMARY OF THE INVENTION

The liquid level measurement device according to the invention includes an indicator having a 360° rotational movement for mounting on a drum, a tank or a container for providing a visual reading related to the level of the liquid in the container. The rotational feature of the indicator accommodates the movement of the indicator to permit upright viewing rather than requiring changing the position of the container. The liquid level measurement device has a frame section that is threaded mounted in the container's bunghole. The indicator is then snapped-on or snapped off the housing and frame section completing the installation. The frame has a buoyant float adapted for floating on the surface of the liquid in the container. In a preferred embodiment the liquid level measurement device has a 270° fractional turn helix as a driver for an attached magnetic coupling, which together with a matching magnetic coupling contained in the indicator comprises a magnetic coupler. The magnetic coupler provides the capability of providing a sealed environment to convey the level of liquid in a container by the use of magnetics, which eliminates the requirements for the conventional shaft, and bearing combination, which prevents a sealed environment. The frame section has two guide bars that engage the float and prevent the float from having a rotational motion instead of the desired linear motion as the float moves in an upward or downward direction on the fractional turn helix.

A ball joint connects the housing and frame sections together and allow the frame section to seek the local vertical of the container. The ball joint contains a retainer pin and slot arrangement to prevent a rotational movement between the frame section and the housing section that would otherwise occur with the float movement. A flexible shaft is used in conjunction with the ball joint to accommodate the rotational movement of the frame section. The indicator provides for a snap-on/snap-off feature that facilitates the removal of the indicator from the container to accommodate safety, material-handling, storage, shipping requirements and permit liquid level readings for multiple containers with a single indicator. The use of one indicator to measure multiple container contents also protects against cross contamination between differing liquid products.

BRIEF DESCRIPTION OF THE DRAWINGS

FIG. 9 is a perspective view showing a float and portions of the guide rods;

FIGS. 10–12 a illustrate a ball joint that may be used to connect the frame section to a housing; and FIG. 13 illustrates a magnetic coupling that may be used to transmit rotational movement of the helix to an indicator dial to show liquid depth; and FIGS. 14–15 illustrate features of a vent assembly that may be included in the invention.

DESCRIPTION OF THE PREFERRED EMBODIMENTS

Figure 1:
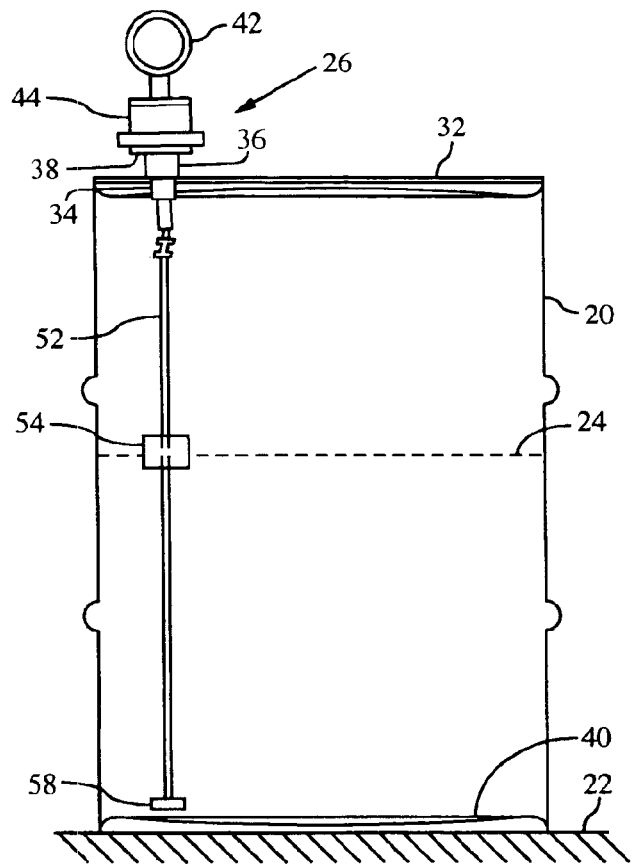
FIG. 1 is a front elevation view of an embodiment of the present invention mounted for use on a vertically oriented container.

Turning now to the drawings and particularly to FIG. 1, a container 20 is depicted for illustrative purposes as being located on a level surface 22 and partially filled with a liquid 24. A liquid level measurement device 26 according to the invention is mounted to the container 20. It is a primary purpose of the liquid level measurement device 26 to measure the depth of the liquid 24 from which (knowing the tank geometry) the volume of liquid 24 in the container 20 can be determined.

Figure 2:
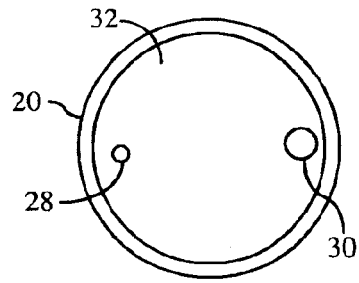
FIG. 2 is a top plan view of the embodiment of the invention of FIG. 1.
Figure 3:
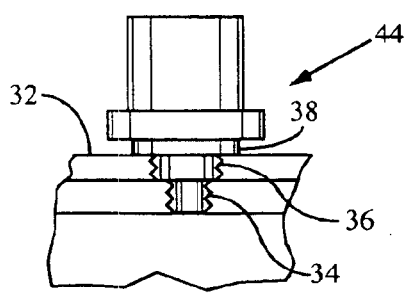
FIG. 3 is are a side elevation, fragmentary view of the measuring device of FIG. 1 threadedly mounted an opening in the top of a container of liquid.
Figure 4:
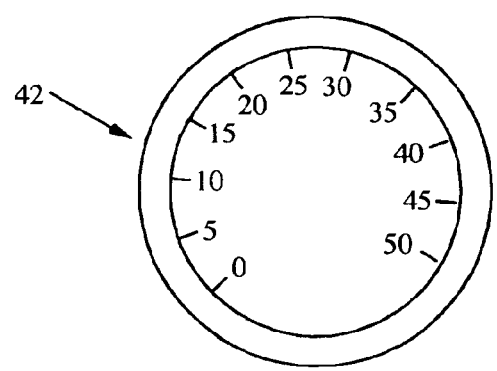
FIG. 4 is an elevation view of an indicator dial face.

Referring to FIG. 2, the container 20 typically has openings 28 and 30 provided in a lid 32 for adding or dispensing liquids. The openings 28 and 30 typically are threaded and have diameters of 0.75 inch and 2 inches respectively. As shown in FIG. 3, the liquid level measurement device 26 has a first threaded coupling 34 and a second threaded coupling 36 that may be used to mount the liquid level measurement device 26 in the openings 28 or 30, respectively. When the coupling 34 is engaged in the 0.75 inch diameter opening 28, the outer end of the coupling 36 is adjacent the portion of the lid 32 surrounding the opening 28. When the coupling 36 is engaged in the opening 30, the coupling 34 extends into the container 20, and a flange 38 that is connected to the coupling 36 is adjacent the portion of the lid 32 surrounding the opening 30.

The liquid level measurement device 26 according to the invention may be advantageously employed for measuring liquids of great variety in tanks. It is considered within the sprit of this invention to make the measurement device small-sized for uses such as measuring liquid depth in drums, barrels, jumbo, rectangular shop tanks, oval shaped tanks for shop, home heating generators and numerous other applications. Therefore, for the convenience of description of the invention, it is described in connection with measuring the depth (and thus amount) of liquids stored and dispensed in such containers.

Figure 7:
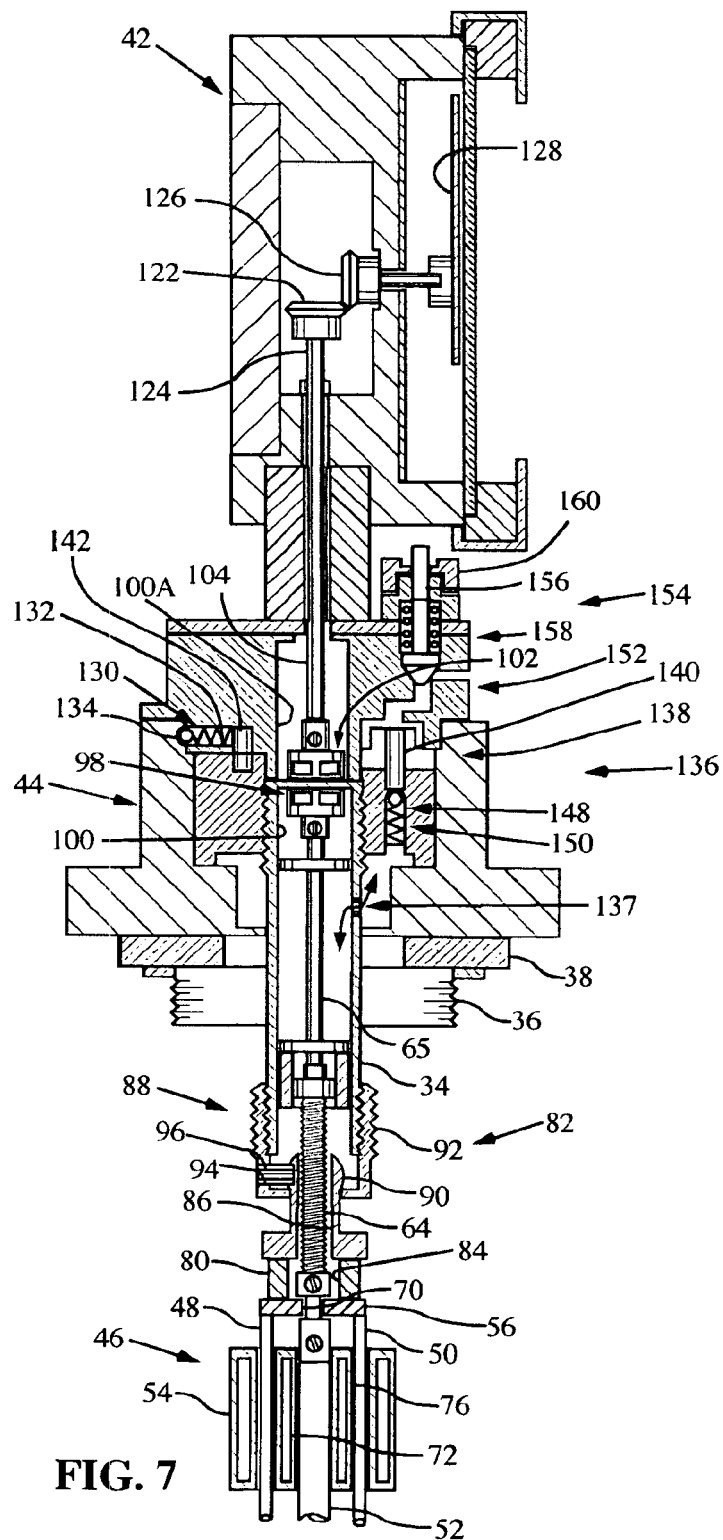
FIG. 7 is a cross-sectional view of the present invention.
Figure 8:
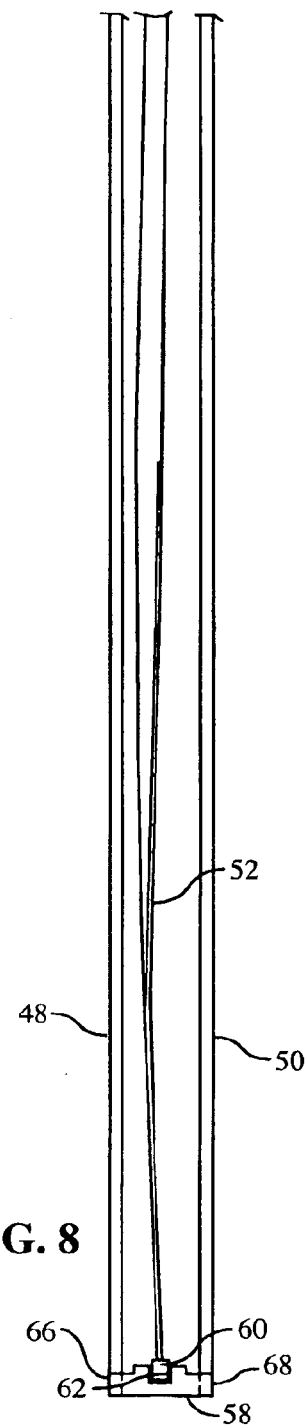
FIG. 8 is a fragmented view of guide rods and a fractional turn helix seated on a base plate.

The liquid level measurement device 26 is an elongated structure having an overall length such that it extends to a location near the bottom end 40 of the container 20. Differing containers have varying lengths, and to conform to this requirement the frame section along with the fractional turn helix and the guide bars can be modified to conform to differing dimensions of the containers involved. As shown in FIGS. 1 and 7, the liquid level measurement device 26 comprises an indicator 42, a housing 44 and a frame section 46. The frame section 46 is pivotally suspended from the housing 44. The frame section 46 includes a pair of guide rods 48 and 50, a fractional turn helix 52, a ball joint 82 and a float 54.

The frame 46 includes an upper plate 56 and a baseplate 58 with the guide bars 48 and 50 arranged to extend between them. The fractional turn helix 52 has a bottom projection 60 that extends into a recess 62 in the baseplate 58. The upper end of the fractional turn helix 52 is connected to a flexible shaft 64 that is in turn connected to a rod 65. The fractional turn helix 52 is suspended between the guide bars 48 and 50. The lower ends of the guide bars 48 and 50 are fastened to outer edge portions 66 and 68 of the baseplate 58. The upper ends of the guide bars 48 and 50 are connected to the upper plate 56. The fractional turn helix 52 is suspended centrally between the guide bars 48 and 50 with the upper end of the fractional turn helix 52 extending through a passage 70 in the upper plate 56.

The float 54 preferably is formed as a cylinder and preferably has a rectangular central passage 72 extending therethrough. A pair of circular passages 74 and 76 is formed near opposite side portions of the float 54. The float 54 is mounted in the frame so that the guide bars 48 and 50 extend through the passages 74 and 76 and the fractional turn helix 52 extends through the passage 72. The guide bars 48 and 50 are parallel so that the float 54 is constrained to linear movement up and down as the liquid level changes in the container. The fractional turn helix 52 can be rotated about the vertical axis. As the height of the float 54 changes, the rectangular cross section fractional turn helix 52 engages the surfaces of the rectangular central passage, which produces a torque on the fractional turn helix 52. The liquid level measurement device 26 is calibrated so that the angular orientation of the fractional turn helix 52 as it rotates about the vertical axis indicates the liquid level in the container 20.

The upper plate 56 is connected to a spacer 80, which is connected to a ball joint assembly 82. The spacer 80 and the ball joint assembly 82 have longitudinal passages 84 and 86, respectively, arranged so that the flexible shaft 64 passes therethrough. The ball joint assembly 82 has a threaded coupling 88 that is connected to the housing 44 to support the weight of the guide rods 48 and 50 and the helix 52.

The ball joint assembly 82 includes a ball member 90 pivotally mounted in a slotted and partially threaded housing 92. As shown in FIGS. 7, 9 and 10, the ball member 90 includes a slot 94. A pin 96 extends from the housing 92 into the slot 94 to prevent the ball joint assembly from rotating about its longitudinal axis while allowing it to pivot so that the guide rods 48 and 50 always are suspended in a vertical orientation inside the container 20.

Figure 6:
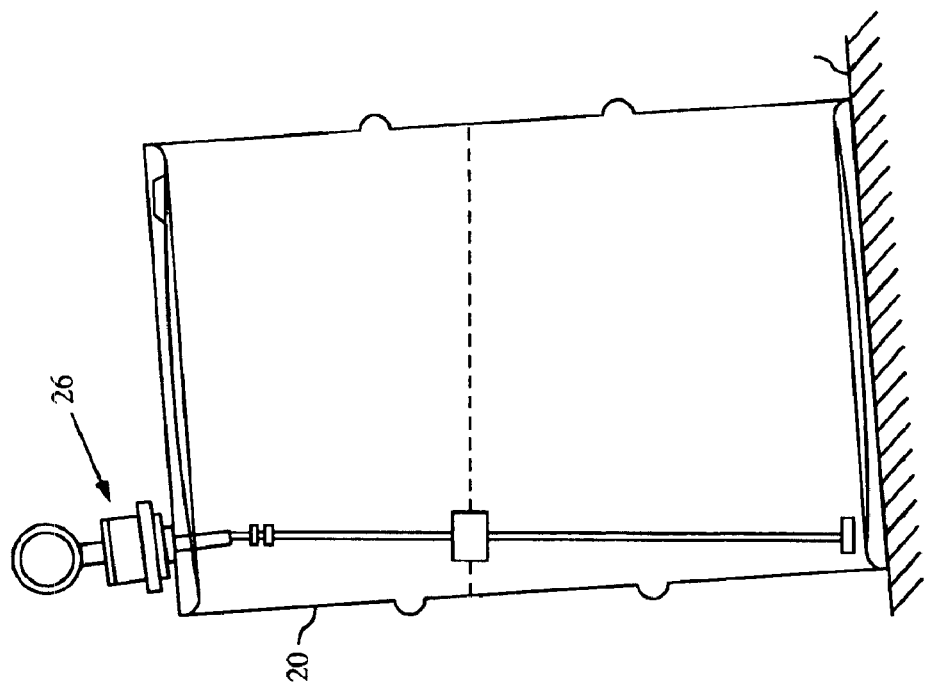
FIG. 6 shows the invention used in a container that is on a surface that is not level.
Figure 5:
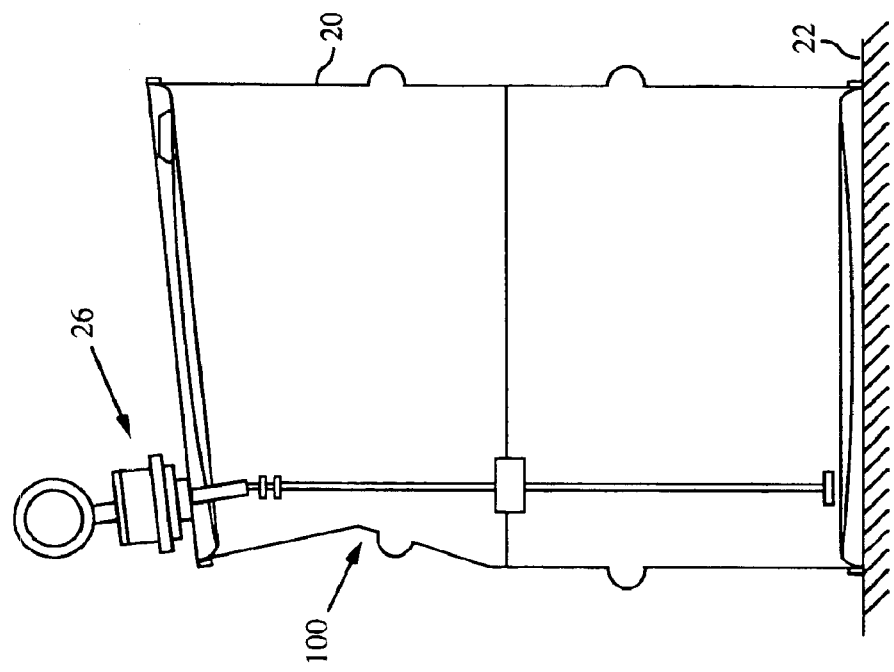
FIG. 5 is a front elevation view of the present invention as mounted for use in the vertical mode showing the self-alignment feature of the device in a distorted container.

As the device 26 is inserted and secured to the container 20 by threading into the selected container hole, the liquid level measurement device 26, as a pendulous system, self aligns seeking the local vertical to adjust for any small angle in any two-plane container orientation (FIGS. 5 and 6). As the frame 46 is inserted into the container 20 the float 54 tends to seek the level of the liquid 24 contained therein.

The rod 65 is connected to a first magnetic assembly 98 to support it in a cavity 100 in the housing 44. A second magnetic assembly 102 is mounted in the cavity 100A by a rod 104 that is rotatably mounted in the housing 44. As shown in FIG. 13, the first magnetic assembly 98 preferably comprises a pair of magnets 106 and 108 mounted in a dielectric disk 110 with opposite poles being adjacent an end of the disk 110. The second magnetic assembly 102 preferably comprises a pair of magnets 114 and 116 mounted in a dielectric disk 118 with opposite poles being adjacent an end 120. The magnetic assemblies 98 and 102 are arranged so that magnets of opposite polarity face one another. Because the magnetic poles of opposite polarity attract one another, they automatically align and remain in alignment as the helix 52 and the rod 65 rotate in response to changes in the liquid level.

A first bevel gear 122 is affixed to an upper end of the rod 124. A second bevel gear 126 is engaged with the first bevel gear 122 and arranged to rotate a pointer 128 in response to rotation of the rod 124.

The magnet assemblies 98 and 102 are arranged so that they are attracted to one another such that rotation of the first magnet assembly 98 causes rotation of the second magnet assembly 102.

The employment of the magnetic coupler approach makes possible another embodiment of the present invention. As shown in FIG. 7, the indicator 42 is arranged to be snap-fit on the housing 46. A spring 130 is mounted in a cavity 132 in the housing 44. A plunger 134 is fastened to the spring 130. The housing 44 has a base that includes a circumferential groove arranged to receive the plunger when sufficient force is used to urge the indicator 42 toward the housing 44. The snap-fit mounting arrangement allows the indicator 42 to turn 360°, making possible the repositioning of the indicator 42 rather than the cumbersome movement of a heavy container. The indicator 42 can be easily removed from one container and attached to another. This embodiment of the invention permits multiple measurements of similar configured containers with a single indicator in addition to protecting the indicator from damage through miss handling and damage from material handling equipment. In the event that the container is positioned in a protective cabinet or the like, the indicator can be removed for clearance purposes.

When the indicator 42 is removed, from the housing 44, the first magnetic 98 assembly remains in the position it was in while the indicator was attached if no liquid is removed from the container 20. If the liquid is removed, magnetic assembly 98 will so indicate. The angular position of the first magnetic assembly 98 is a function only of the liquid level. When the indicator 42 is reattached to the housing 46, the second magnetic assembly returns to its previous or changed angular position to indicate the liquid level.

In addition, this use of a magnetic coupler provides a sealed environment between the contents of the container and the outer environment and eliminates the need for conventional shafts and prevents the associated leakage of fumes and liquid that can contaminate instrument components and the environment. The magnetic coupler feature also provides for the means for the snap on snap off feature of the indicator that permits the removal of the indicator from the device with out the need to remove the entire device from the container or the like. This feature also accommodates the multiple readings of numerous containers with a single indicator and hence avoiding contamination of liquid products. Another feature of the device is the use of the flexible spring shaft 65 in conjunction with ball joint assembly 82 to accommodate the free axial movement of the frame section 46 of the device and assures a continual alignment with the vertical.

The invention includes a venting system 136 shown in FIG. 7. The housing 44 includes a passage 137 that allows pressurized gasses to flow between the housing 44 and the indicator assembly. The indicator assembly 42 includes an airflow valve 138, a plunger pin 140 and a locator pin 142. When the locator pin 142 is seated in a corresponding hole in the housing 44, the plunger pin 140 seats in a hole in the housing 44. As the connection of the indicator assembly 42 and the housing 44 occurs, the plunger pin 140 compresses a spring 150 with its associated ball seal to open a vent hole 148. The venting action passes through a vent passage 152 to a pressure release assembly 154 that includes a piston 156, a spring 158 and a cap 160. As the venting pressure impacts the piston 156, the spring 158 contracts to force the piston 156 to an open position, which relieves the pressure in the container 20. The vent system 136 may be manually opened by pulling outward on the cap 160 and then turning it to lock it in its open position.

Although the present invention described in connection with a preferred embodiment it is to be understood that modifications within the scope of the invention may occur to those skilled in the appertaining art.

What is claimed is:

1. A system for actuating an indicator assembly in response to a depth change in a liquid that is confined to a container, comprising:

a housing;

a float constrained to vertical movement in response to changes in liquid depth in the container;

an actuator connected to the housing and arranged to move in response to vertical movement of the float wherein the actuator is pivotally mounted to the housing such that the actuator self aligns with the vertical when the housing is mounted to the container with the actuator extending into the container;

a coupler mechanism arranged to transfer movement of the actuator to the indicator assembly; and a ball joint assembly mounted between the housing and the guide rods such that the guide rods and the actuator form a pendulous system that self aligns with the vertical.

2. The system of claim 1, further comprising:

a pair of parallel rods connected to the housing and arranged to be inserted into the liquid; and the float being slidably mounted to the rods such that the float is constrained to linear movement lengthwise along the rods.

3. The system of claim 2 wherein the float includes a first passage and a second passage extending therethrough and arranged in corresponding relationship to the pair of rods such that a first rod extends through the first passage and a second rod extends through the second passage, the passages and rods being arranged to constrain the float to linear movement along the rods.

4. The system of claim 3, further comprising a third passage extending through the float, the actuator being arranged to extend through the third passage, the actuator and the float being arranged so that linear movement of the float along the rods causes rotational movement of the actuator.

5. The system of claim 4 wherein the third passage has a rectangular horizontal cross section and the actuator is formed as an elongate rod having a rectangular horizontal cross section, the elongate rod being formed as a helix that rotates about its longitudinal axis as the float moves vertically along the rods.

6. The system of claim 4 wherein the coupler mechanism includes a magnetic coupler arranged to couple rotational movement of the actuator to the indicator assembly.

7. The system of claim 1 wherein the float and the actuator are arranged such that vertical movement of the float produces rotational movement of the actuator.

8. The system of claim 1, further including a detent pin extending from the housing into a slot formed in the ball joint assembly to restrain the ball joint assembly from rotating about its longitudinal axis.

9. The system of claim 1 wherein the coupler mechanism includes a magnetic coupler arranged to couple rotational movement of the actuator to the indicator.

10. The system of claim 1 wherein the housing includes a first coupling for mounting the frame in an opening of a first diameter in the container and a second coupling axially aligned with the first coupling for mounting the frame in an opening of a second diameter in the container, the second opening having a diameter larger than that of the first opening.

11. A system for actuating an indicator assembly in response to a depth change in a liquid that is confined to a container, comprising:
   a housing;
   a float constrained to vertical movement in response to changes in liquid depth in the container;
   an actuator connected to the housing and arranged to move in response to vertical movement of the float;
   a coupler mechanism arranged to transfer movement of the actuator to the indicator assembly, the coupler mechanism comprising:
     a first rod connected to the actuator;
     a first dielectric disk connected to the first rod, the first dielectric disk being mounted inside the housing;
     a first pair of magnets mounted in the first dielectric disk;
     a second rod included in the indicator assembly;
   a second dielectric disk connected to the second rod, the second dielectric disk being mounted inside the indicator assembly with the indicator assembly being arranged to be removable from the housing while the container remains sealed by the housing mounted in the container opening; and
     a second pair of magnets mounted in the second dielectric disk, the first and second pair of magnets being arranged to be in facing relationship so that poles of opposite polarity are in longitudinal alignment;
   a pair of parallel rods connected to the housing and arranged to be inserted into the liquid;
   the float being slidably mounted to the rods such that the float is constrained to linear movement lengthwise along the rods, wherein the float includes a first passage and a second passage extending therethrough and arranged in corresponding relationship to the pair of rods such that a first rod extends through the first passage and a second rod extends through the second passage, the passages and rods being arranged to constrain the float to linear movement along the rods, the float further including a third passage extending through the float, the actuator being arranged to extend through the third passage, the actuator and the float being arranged so that linear movement of the float along the rods causes rotational movement of the actuator; and
   wherein the housing includes a vent passage into the container and the indicator assembly includes apparatus for opening the vent passage when the indicator assembly is mounted on the housing.

12. A system for actuating an indicator assembly in response to a depth change in a liquid that is confined to a container, comprising:
   a housing;
   a float constrained to vertical movement in response to changes in liquid depth in the container;
   an actuator connected to the housing and arranged to move in response to vertical movement of the float;
   a coupler mechanism arranged to transfer movement of the actuator to the indicator assembly; and
   wherein the housing includes a vent passage into the container and the indicator assembly includes apparatus for opening the vent passage when the indicator assembly is mounted on the housing.

* * * * *